3,265,650
ARTIFICIAL SNOW COMPOSITIONS COMPRISING POLYVINYL ACETATE AND WATER

Robert J. Kerr, North Barrington, Ill., assignor to Robert J. Kerr, Inc., Chicago, Ill., a corporation of Illinois
No Drawing. Filed May 20, 1963, Ser. No. 281,814
9 Claims. (Cl. 260—23)

The present invention relates to compositions which are sprayable to produce a flocculent snow-like coating particularly useful for the decoration of Christmas trees.

Artificial snow compositions have been available on the market for many years and include, basically, a synthetic resinous flocking agent in combination with a normally gaseous propellant such as a polyhalogenated lower alkane of the "Freon" type.

In an earlier patent, U.S. Patent No. 2,659,704 issued November 17, 1953, I described an improved self-spraying artificial snow formulation which could be used without bubbling at very close spraying ranges, which had a substantially increased quantity of active and solid ingredients, and which was substantially odor-free. Specifically, the compositions of the prior patent included a synthetic resin polymer as a flocking agent, a solvent for the polymer, a higher fatty acid as a bulking material, and a volatile polyhalogenated lower molecular weight alkane as the gaseous propellant. While the compositions of the prior patent provided excellent results regardless of whether the spraying composition had a low or high solids content, the compositions were necessarily on the expensive side since they included substantial amounts of the relatively expensive propellant. In addition, the compositions normally employed relatively high amounts of the synthetic resins which also tended to increase the cost.

An object of the present invention is to provide an improved self-spraying artificial snow composition which significantly decreases the cost of such compositions without sacrifice in the quality of the flocculent coating produced.

Another object of the invention is to provide a self-spraying artificial snow composition which uses substantially less propellant than has been the common practice heretofore.

Still another object of the invention is to provide a self-spraying coating composition of the type described which uses, on the average, less of the synthetic resinous flocking agent than has been customary in the past.

I have now found that by suitable adjustment of the amounts of flocking agent, bulking agent, and the like, I can provide a completely satisfactory self-spraying snow composition which contains substantial amounts of water in replacement of a large amount of the normally gaseous propellant which has heretofore been used. Specifically, I have found that the combination of from ¼ to 2% by weight of a polyvinyl acetate resin, from 30 to 50% by weight of a water immiscible organic solvent for the resin, from 2 to 15% by weight of a bulking agent containing a higher fatty acid, from 5 to 20% by weight of a normally gaseous propellant, and from 30 to 50% by weight of water provides a composition capable of spraying on a flocculent, white deposit which is as satisfactory as compositions of the past which used substantially greater amounts of the propellants.

Particularly good results are obtained by the use of a composition containing from ½ to 1% by weight of the polyvinyl acetate resin, from 35 to 45% by weight of the water immiscible organic solvent, from 5 to 10% by weight of the higher fatty acid bulking agent, from 8 to 15% by weight of the normally gaseous propellant, and from 35 to 45% by weight of water.

While in the past, other resins such as acrylate resins have been used as flocking agents in addition to polyvinyl acetate, I find that for the present purposes the two are not substantial equivalents. Considerably better results are obtained by using the polyvinyl acetate polymers, particularly those of very high molecular weight (500,000 or above). The higher the molecular weight, the less resin that is required. For example, using a polyvinyl acetate resin having a molecular weight of about one million (average) as little as 3/10 of 1% of the resin is required to produce a good flake. If a polyvinyl acetate resin of an average molecular weight of about 500,000 is used, it requires almost three times as much resin to make the same flake.

Chlorinated organic solvents are the preferred materials for use in this composition. The function of the solvent is to effect solution of the resin and the bulking agent. It should be relatively volatile, and should be immiscible with water. For various considerations such as solvent properties, non-flammability, and low cost, I prefer to use methylene chloride for this purpose. Other chlorinated hydrocarbons could be used, of course, but the increased cost is normally not justified by whatever slight advantages the other chlorinated hydrocarbons may have over methylene chloride. Of course, it is possible to use solvents such as benzene or toluene which are even cheaper than methylene chloride but they have the disadvantage of being inflammable and are therefore not acceptable for general use.

The bulking agent employed in my composition contains one or more higher fatty acids, that is, acids containing from 12 to 18 carbon atoms per molecule. Acids included within this designation are materials such as lauric, myristic, palmitic, stearic, oleic, and the like. The bulking agent replaces or supplements a portion of the resin content, and gives it the white color. It also tends to improve the spraying performance, and to mask any odor created by the presence of the resin. Obviously, completely refined fatty acids need not be employed, as excellent results can be obtained with the less expensive commercial products containing mixtures of such acids. A particularly economical fatty acid bulking agent is the material known as "hydrogenated tallow oil" which is a synthetic fatty acid composition containing approximately 40% palmitic acid, 55% stearic acid, and 5% of other fatty acids.

The normally gaseous propellant employed in accordance with the present invention consists at least in part of a polyhalogenated lower alkane. These materials are well known as refrigerants and as propellants, and contain one or two carbon atoms per molecule, and at least three halogen atoms, of which at least one is fluorine, and at least one is chlorine. Typical examples of propellants include compounds such as trichloromonofluoromethane, dichlorodifluoromethane, chlorotrifluoromethane, dichloromonofluoromethane, difluoromonochloromethane, trichlorotrifluoroethane, dichlorotetrafluoroethane, monochloropentafluoroethane and chlorodifluoromethylmethane.

It is not essential that the entire composition of the propellant consist of the polyhalogenated lower alkane. A portion of the propellant may consist of a normally gaseous hydrocarbon such as propane. Substitution of from ¼ to ½ part of propane in every two parts of the combined propellant provides an effective propelling action without creating a fire hazard. Generally speaking, enough propellant will be added to secure the pressure required in the spraying can, which is normally on the order of 40 pounds per square inch.

The water present in the composition helps to disperse the spray and helps the solid ingredients in the composition to adhere to the surface being coated. None of the other ingredients is dissolved in or emulsified in the water and the water therefore acts essentially as a physical dispersant for the simultaneously atomized solution of a flocking agent and bulking agent.

The following specific examples are given to illustrate particularly preferred compositions in accordance with the present invention:

EXAMPLE I

| | Percent by wt. |
|---|---|
| Polyvinyl acetate resin | 0.52 |
| Methylene chloride | 30 |
| Hydrogenated tallow oil | 7.48 |
| "Freon 12" (dichlorodifluoromethane) | 16 |
| Propane | 6 |
| Water | 40 |

EXAMPLE II

| | |
|---|---|
| Polyvinyl acetate resin | 0.5 |
| Methylene chloride | 40 |
| Hydrogenated tallow oil | 7.5 |
| "Freon 12" | 6 |
| Propane | 6 |
| Water | 40 |

Both of the above identified compositions provided excellent artificial snow coatings when sprayed in the usual manner.

It should be evident that various modifications can be made to the described embodiments without departing from the scope of the present invention.

I claim as my invention:

1. A package comprising a sealed container charged under pressure with a self-spraying artificial snow composition comprising from ¼ to 2% by weight of a polyvinyl acetate homopolymer resin, from 30 to 50% by weight of a water immiscible organic solvent for said resin, from 2 to 15% by weight of at least one higher fatty acid as a bulking agent, from 5 to 20% by weight of a normally gaseous propellant, and from 30 to 50% by weight of water.

2. A package comprising a sealed container charged under pressure with a self-spraying artificial snow composition comprising from ¼ to 2% by weight of a polyvinyl acetate homopolymer resin having a molecular weight of at least 500,000, from 30 to 50% by weight of a water immiscible organic solvent for said resin, from 2 to 15% by weight of at least one higher fatty acid as a bulking agent, from 5 to 20% by weight of a normally gaseous propellant, and from 30 to 50% by weight of water.

3. A package comprising a sealed container charged under pressure with a self-spraying artificial snow composition comprising from ½ to 1% by weight of a polyvinyl acetate homopolymer resin, from 35 to 45% by weight of a water immiscible organic solvent for said resin, from 5 to 10% by weight of at least one higher fatty acid as a bulking agent, from 8 to 15% by weight of a normally gaseous propellant, and from 35 to 45% by weight of water.

4. A package comprising a sealed container charged under pressure with a self-spraying artificial snow composition comprising from ½ to 1% by weight of a polyvinyl acetate homopolymer resin having a molecular weight of at least 500,000, from 35 to 45% by weight of a water immiscible organic solvent for said resin, from 5 to 10% by weight of at least one higher fatty acid as a bulking agent, from 8 to 15% by weight of a normally gaseous propellant, and from 35 to 45% by weight of water.

5. The container of claim 1 in which said solvent is a chlorinated organic solvent.

6. The container of claim 1 in which said solvent is methylene chloride.

7. The container of claim 1 in which said propellant is a mixture of a polyhalogenated lower alkane and propane.

8. A package comprising a sealed container charged under pressure with a self-spraying artificial snow composition comprising from ¼ to 2% by weight of a polyvinyl acetate homopolymer resin, from 30 to 50% by weight of methylene chloride, from 2 to 15% by weight of at least one fatty acid having from 12 to 18 carbon atoms per molecule as a bulking agent, from 5 to 20% by weight of a normally gaseous propellant, and from 30 to 50% by weight of water.

9. The container of claim 8 in which said propellant is a mixture of a polyhalogenated lower alkane and propane.

References Cited by the Examiner

UNITED STATES PATENTS

| 2,524,590 | 10/1950 | Boe | 252—305 |
| 2,659,704 | 11/1953 | Kerr | 260—23 |
| 3,042,638 | 7/1962 | Dragotta et al. | 260—23 |

OTHER REFERENCES

Shepherd, "Aerosols: Science and Technology" (1961), pp. 35–37, copy in Scientific Library, TP244A3S4.

LEON J. BERCOVITZ, *Primary Examiner.*

DONALD E. CZAJA, R. A. WHITE, *Assistant Examiners.*